US012706917B2

(12) United States Patent
Kumar et al.

(10) Patent No.: US 12,706,917 B2
(45) Date of Patent: Aug. 11, 2026

(54) SYSTEM AND METHOD TO EVALUATE COMMUNICATION OPERATIONS

(71) Applicant: Bank of America Corporation, Charlotte, NC (US)

(72) Inventors: Ashok Kumar, Hyderabad (IN); Narsing Raj, Hyderabad (IN); Devulapalli Venkata Lakshmi Sai Siva Kumar, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 73 days.

(21) Appl. No.: 18/752,676

(22) Filed: Jun. 24, 2024

(65) Prior Publication Data

US 2025/0392598 A1 Dec. 25, 2025

(51) Int. Cl.
*H04L 9/40* (2022.01)

(52) U.S. Cl.
CPC .................................. *H04L 63/102* (2013.01)

(58) Field of Classification Search
CPC ..... H04L 9/0852; H04L 9/3271; H04L 63/08; H04L 63/0853; H04L 63/1425; G06F 21/62; G06F 21/316; G06F 21/554; H04W 12/106; G06Q 10/0635; G06Q 30/0185; G06V 10/75
See application file for complete search history.

(56) References Cited

U.S. PATENT DOCUMENTS 9,065,893 B2 6/2015 Glaser
10,454,498 B1 10/2019 Mao
10,884,636 B1 1/2021 Abrol et al.
11,010,233 B1 5/2021 Golden et al.
11,080,155 B2 8/2021 Kannan et al.
11,095,439 B1 * 8/2021 Vakili ..................... H04L 63/08
11,184,766 B1 * 11/2021 Lord ...................... G06V 10/75
11,455,409 B2 9/2022 Fisher et al.
11,604,690 B2 3/2023 Yurzola et al.
11,651,313 B1 * 5/2023 Fridakis ............ G06Q 10/0635 705/7.28
11,734,097 B1 8/2023 Golden et al.
11,775,479 B2 10/2023 Wood et al.
11,822,807 B2 11/2023 Hankins et al.
(Continued)

FOREIGN PATENT DOCUMENTS

JP 2023011781 A 1/2023

*Primary Examiner* — Dustin Nguyen

(57) ABSTRACT

A system comprises a memory communicatively coupled to at least one processor. The at least one processor is configured to receive access feedback from an entity requesting to access one or more network resources in a communication network. Further, the processor is configured to execute a machine learning algorithm to monitor the access feedback in the communication network for a period of time, determine one or more tracked activities and metadata from the access feedback, generate one or more predicted activities based on the metadata, generate an adverse impact assessment granting preliminary access between the entity and the one or more network resources in response to determining that the tracked activities match the predicted activities within a predefined adverse impact threshold, and create a quantum access command for the entity. The processor is configured to provide the quantum access command to the entity.

20 Claims, 3 Drawing Sheets

(56) References Cited

U.S. PATENT DOCUMENTS

| | | | | |
|---|---|---|---|---|
| 11,824,275 | B2 | 11/2023 | Tran et al. | |
| 12,041,067 | B2 * | 7/2024 | Thomas | H04L 63/08 |
| 2005/0249352 | A1 * | 11/2005 | Choi | H04L 9/0852 380/286 |
| 2011/0225644 | A1 * | 9/2011 | Pullikottil | H04L 63/1425 726/11 |
| 2018/0062764 | A1 | 3/2018 | Borrill | |
| 2018/0237040 | A1 | 8/2018 | Mong et al. | |
| 2020/0137067 | A1 * | 4/2020 | Nambiar | G06F 21/554 |
| 2020/0257933 | A1 | 8/2020 | Steingrimsson et al. | |
| 2021/0160052 | A1 | 5/2021 | Chalker | |
| 2021/0182190 | A1 | 6/2021 | Gao et al. | |
| 2021/0279204 | A1 | 9/2021 | Grunwald et al. | |
| 2021/0342441 | A1 * | 11/2021 | Ross | G06F 21/316 |
| 2022/0188700 | A1 | 6/2022 | Khavronin et al. | |
| 2023/0058053 | A1 * | 2/2023 | Hunt | H04W 12/106 |
| 2023/0269246 | A1 * | 8/2023 | Mohanty | H04L 63/0853 726/7 |
| 2024/0204999 | A1 * | 6/2024 | Tong | G06F 21/62 |
| 2024/0275817 | A1 * | 8/2024 | Grout | H04L 63/1425 |
| 2024/0291675 | A1 * | 8/2024 | Balmakhtar | H04L 9/3271 |
| 2024/0311847 | A1 * | 9/2024 | Negandhi | G06Q 30/0185 |

* cited by examiner

SYSTEM AND METHOD TO EVALUATE COMMUNICATION OPERATIONS

TECHNICAL FIELD

The present disclosure relates generally to providing security operations, and more specifically to a system and method to evaluate communication operations.

BACKGROUND

In communication systems, cyberattacks are more prevalent as cybersecurity becomes more dependent and influenced by emerging and disruptive technologies. Databases that store valuable, confidential, and sensitive information may be targets for cyberattacks. Recent data breaches have underscored growing sophistications of bad actors and complexities associated with managing databases in an increasingly connected world. In particular, bad actors may devise new ways to infiltrate entire databases and data eco-systems.

SUMMARY OF THE DISCLOSURE

In one or more embodiments, systems and methods are configured to evaluate communication operations. In particular, the systems may be configured to train a machine learning (ML) model to predict entity actions and/or operations in a communication network. The entities may be users and/or bad actors attempting to access databases in the communication network. In some embodiments, the actions and/or operations may be evaluated by one or more ML algorithms in accordance with supervised ML models and/or unsupervised ML models. The supervised ML models may be ML models trained to understand and/or predict operations associated with a specific user profile in the communication network. The unsupervised ML models may be ML models trained to understand and/or predict operations associated with general behavior of entities interacting with the communication network. The systems may be configured to determine whether one or more tracked activities match activities stored in and activity repository. In response to determining that the tracked activities match the predicted activities within a predefined adverse impact threshold, the systems may be configured to generate an adverse impact assessment granting preliminary access between an entity and the one or more network resources. In this regard, the systems may be configured to create a quantum access command for the entity. The quantum access command may comprise one or more keys to access the network resources. Further, in response to determining that the tracked activities do not match the predicted activities within the predefined adverse impact threshold, the systems may be configured to generate a report (e.g., warning message and/or alert) indicating that the entity is a bad actor attempting to access sensitive databases.

In one or more embodiments, the systems described herein are integrated into a practical application of providing security layers before accessing network resources in a communication network. In particular, the systems may be configured to execute an ML algorithm that causes the systems to determine whether tracked data matches predicted data associated with an entity attempting to access network resources in a communication network. Further, the systems are configured to dynamically separate bad actors from legitimate users attempting to reach network resources in the communication network by providing classical layers and quantum layers of encryption.

In one or more embodiments, the systems are directed to improvements in computer systems. Specifically, the systems reduce processor and memory usage in servers and/or user devices by quickly identifying bad actors from legitimate users attempting to access network resources in a communication network. As entities are determined to be bad actors based on their actions in the network, the systems are configured to filter these bad actors from accessing some or all network resources and/or sensitive information in the network. Herein, processing and memory usage is reduced because processing and memory resources are not made available to all entities attempting to access the network. Instead, the systems filter out bad actors and the processing and memory resources are made accessible to entities determined to be legitimate users. Further, the systems are configured to prevent resources from being wasted retrieving data and/or restoring sensitive information in the communication network. In this regard, the systems inhibit tracking of possible adverse impacts that bad actors could have caused in the network were the bad actors to reach sensitive information and/or network resources. As a result, workforce hours, processing resources, memory resources, and/or power resources are not spent retroactively tracking the actions of bad actors in the communication network.

In one or more embodiments, the systems may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured, when executed, to evaluate data in accordance with one or more machine learning models. The at least one processor may be configured to receive access feedback from an entity requesting to access one or more network resources in a communication network. Further, the processor may be configured to execute the machine learning algorithm to monitor the access feedback in the communication network for a period of time, determine one or more tracked activities and metadata from the access feedback, generate one or more predicted activities based on the metadata, determine whether the tracked activities matches the predicted activities within a predefined adverse impact threshold, generate an adverse impact assessment granting preliminary access between the entity and the one or more network resources in response to determining that the tracked activities matches the predicted activities within a predefined adverse impact threshold, and create a quantum access command for the entity. The quantum access command may comprise one or more keys to access the network resources. The processor may be configured to provide the quantum access command to the entity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
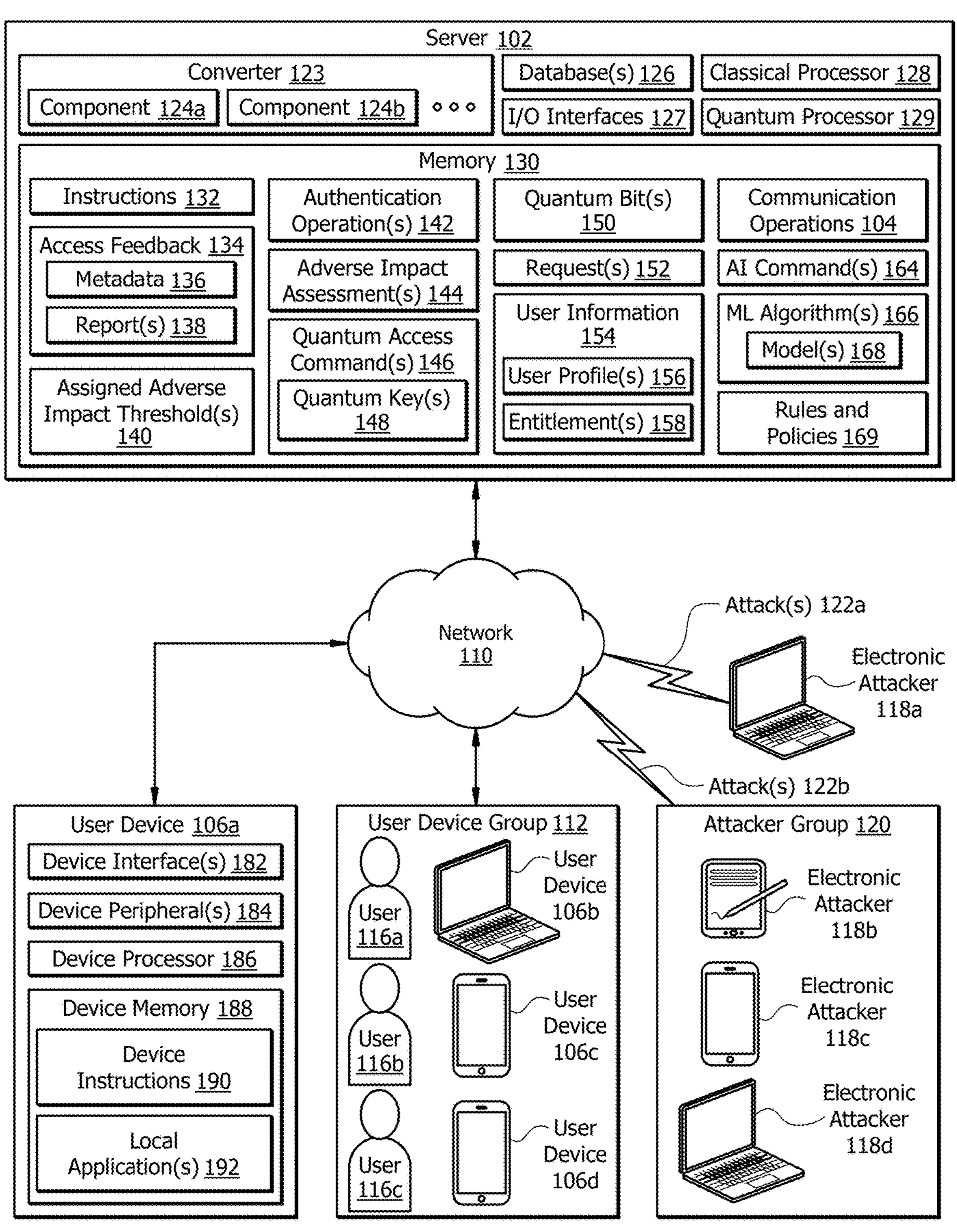
FIG. 1 illustrates a system in accordance with one or more embodiments.
Figure 2:
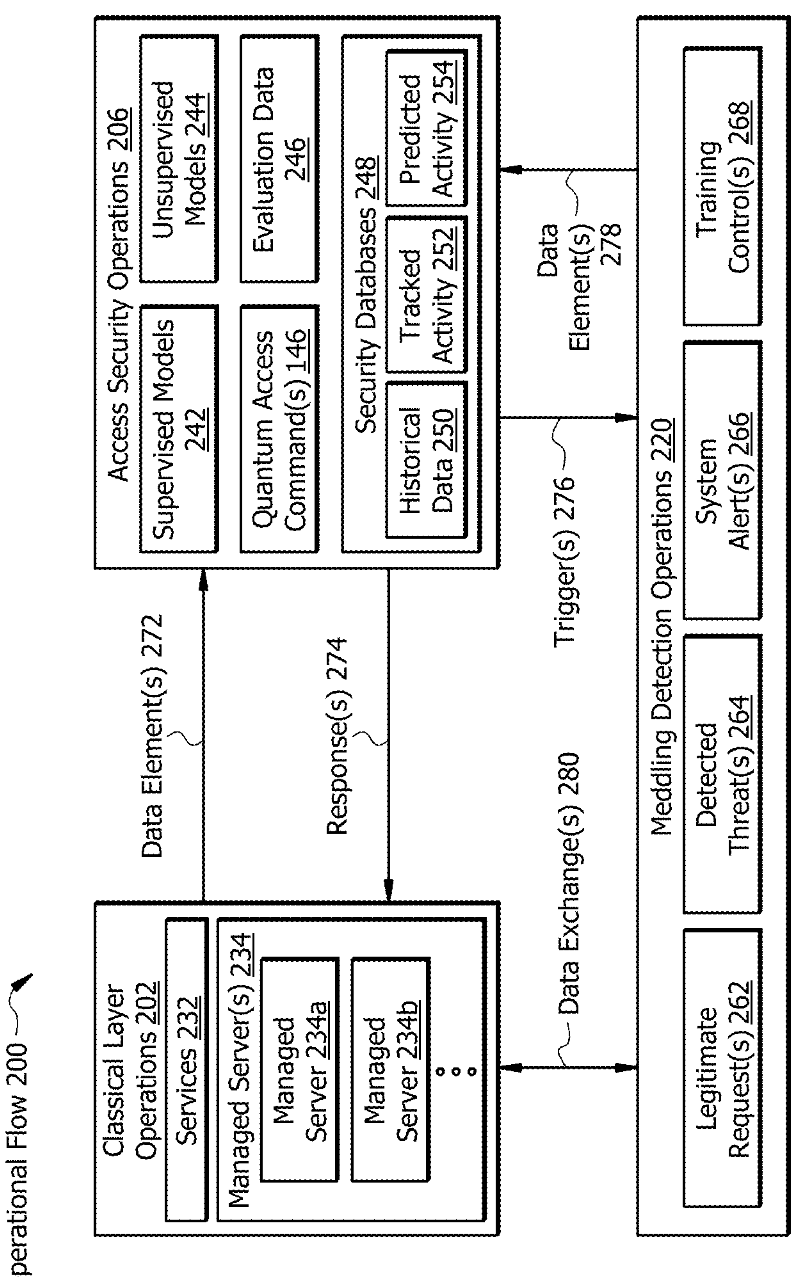
FIG. 2 illustrates an operational flow configured to evaluate communication operations in accordance with one or more embodiments.
Figure 3:
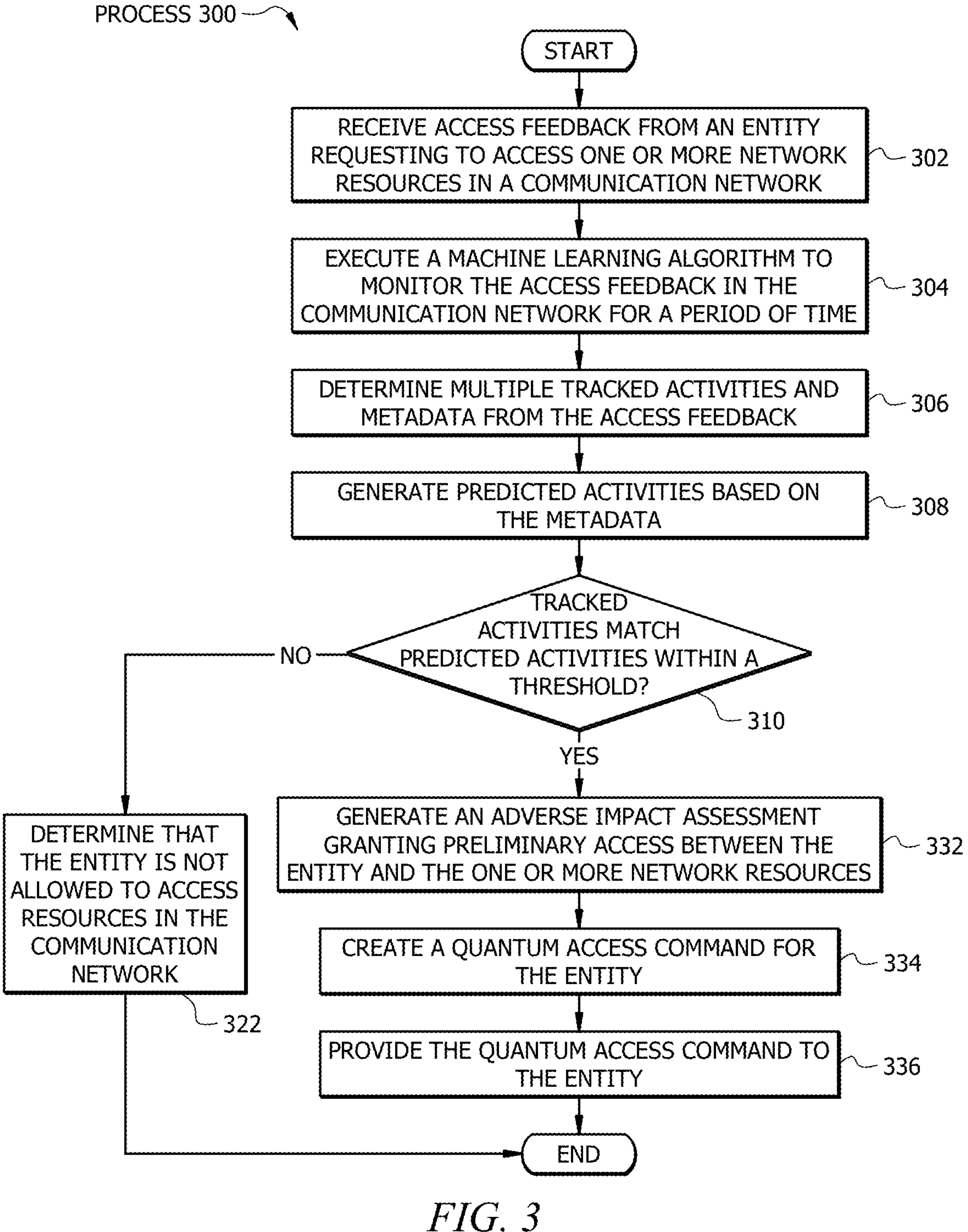
FIG. 3 illustrates an example flowchart of a method to perform the operational flow of FIG. 2 in accordance with one or more embodiments.

As described above, this disclosure provides various systems and methods to evaluate communication operations. FIG. 1 illustrates a system 100 in which a server 102 configured to analyze one or more communication operations 104. FIG. 2 illustrates an operation flow 200 performed by the system 100 of FIG. 1. FIG. 3 illustrates a process 300 performed by the system 100 of FIG. 1.

System Overview

FIG. 1 illustrates an example system 100, in accordance with one or more embodiments. The system 100 may comprise a server 102 configured to evaluate one or more communication operations 104. The system 100 includes a server 102 communicatively coupled to a user device 106, a user device 106*b*, a user device 106*c*, and a user device 106*d* (collectively, user devices 106) via a network 110. The user devices 106 may be user nodes configured to trigger exchanges of data and/or perform one or more communication operations 104 with the server 102 via the network 110. The user devices 106 may be working nodes configured to receive instructions to perform one or more communication operations 104 based on instructions received from the server 102. In some embodiments, some of the user devices 106 may be clustered together in one or more user device groups 112. Each of the user devices 106 may be associated with one or more corresponding operators. These operators are shown as a user 116*a*, a user 116*b*, and a user 116*c* (collectively, users 116) in the user device groups 112. In FIG. 1, the user device group 112 is shown comprising the user 116*a* associated with the user device 106*b*, the user 116*b* associated with the user device 106*c*, and the user 116*c* associated with the user device 106*d*.

In one or more embodiments, the example of FIG. 1 shows an electronic attacker 118*a*, an electronic attacker 118*b*, an electronic attacker 118*c*, and an electronic attacker 118*d* (collectively, electronic attackers 118). In some embodiments, some of the electronic attackers 118 may be clustered together in one or more attacker groups 120. In FIG. 1, the attacker group 120 is shown comprising the electronic attacker 118*b*, the electronic attacker 118*c*, and the electronic attacker 118*d*. These electronic attackers 118 may be bad actors attempting to perform one or more attacks 122 (e.g., attacks 122*a* and attacks 122*b*) to the server 102, the user devices 106, the network, and/or the user device groups 112.

In one or more embodiments, the server 102 may comprise a converter 123 comprising a component 124*a* and a component 124*b* (collectively, components 124), one or more databases 126, one or more server input (I)/output (O) interfaces 127, at least one classical processor 128 (e.g., a server processor), at least one quantum processor 129, and at least one memory 130 communicatively coupled to one another. In some embodiments, the memory 130 may comprise instructions 132, access feedback 134 comprising metadata 136 and one or more reports 138, one or more assigned adverse impact thresholds 140, one or more authentication operations 142, one or more adverse impact assessments 144, one or more quantum access commands 146 comprising one or more quantum keys 148, one or more quantum bits 150, one or more requests 152, user information 154 comprising one or more user profiles 156 and one or more entitlements 158, the one or more communication operations 104, one or more artificial intelligence (AI) commands 164, one or more machine learning (ML) algorithms 166 configured to train one or more models 168, and one or more rules and policies 169.

Referring to the user device 106*a* a non-limiting example, the user device 106*a* may comprise one or more device interfaces 182, one or more device peripherals 184, at least one device processor 186, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the user devices 106), additional databases, systems, and the like, via the one or more server I/O interfaces 127 (i.e., a user interface or a network interface). The server 102 may comprise the classical processor 128 that is generally configured to oversee operations of the processing engine. The operations of the processing engine are described further below in conjunction with the system 100 described in FIG. 1, the operational flow 200 in FIG. 2, and the process 300 described in FIG. 3.

The server 102 comprises multiple databases 126 configured to provide one or more memory resources to the server 102 and/or the user devices 106. The server 102 comprises the classical processor 128 and the quantum processor 129 communicatively coupled with the converter 123, the databases 126, the server I/O interfaces 127, and the memory 130. The server 102 may be configured as shown, or in any other configuration. In one or more embodiments, the databases 126 are configured to store data that enables the server 102 to configure, manage and coordinate one or more middleware systems. In some embodiments, the databases 126 store data used by the server 102 to function as a halfway point in between one or more services and other tools or databases.

The converter 123 is configured to convert data items represented by classical binary bits to quantum bits 150. The converter 123 is further configured to convert data items represented by quantum bits 150 to classical binary bits. In certain embodiments, the converter 123 comprises a plurality of components 124 that are configured to generate and manipulate quantum bits 150. In the illustrated embodiment, the plurality of components 124 and the quantum processor 129 are configured to operate on a same type of quantum bits 150. For example, when the quantum processor 129 comprises a photon-based device (with qubits implemented by modes of photons), the plurality of components 124 may comprise optical components such as lasers, mirrors, prisms, waveguides, interferometers, optical fibers, filters, polarizers, and/or lenses.

In one or more embodiments, the server I/O interfaces 127 may be configured to enable wired and/or wireless communications. The server I/O interfaces 127 may be configured to communicate data between the server 102 and other user devices (i.e., the user devices 106), network devices (i.e., routers in the network 110), systems, or domain(s) via the network 110. For example, the server I/O interfaces 127 may comprise a WI-FI interface, a LAN interface, a WAN interface, a modem, a switch, or a router. The classical processor 128 may be configured to send and receive data using the server I/O interfaces 127. The server I/O interfaces 127 may be configured to use any suitable type of communication protocol. In some embodiments, the server I/O interfaces 127 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The classical processor 128 comprises one or more processors communicatively coupled to the memory 130. The classical processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The classical processor 128 may be a programmable logic device, a microcontroller, a microprocessor, or any suitable combination of the preceding. The one or more classical processor 128 are configured to process data and may be implemented in hardware or software executed by hardware. For example, the classical processor 128 may be 8-bit, 16-bit, 32-bit, 64-bit or of any other suitable architecture. The classical processor 128 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more classical processor 128 are configured to execute various instructions. For example, the one or more classical processor 128 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 127 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 127 may be configured to support any suitable type of communication protocol as would be appreciated by one of ordinary skill in the art. In one or more embodiments, the server I/O interfaces 127 may comprise one or more sensors configured to evaluate physical phenomena surrounding the server 102 and/or one or more of the user devices 106. The sensors may be proximity sensors, optical sensors, and the like.

The quantum processor 129 may comprise one or more quantum processors operably coupled to the memory 30. The quantum processor 129 may be configured to process quantum bits 150. The quantum processor 129 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements quantum bits with states of a respective quantum system. The quantum processor 129 may be configured to execute one or more quantum algorithms (as part of the one or more instructions 132) to perform one or more functions described herein.

The quantum processor 129 may be configured to implement a quantum algorithm (e.g., Grover's search algorithm) to execute one or more quantum operations upon executing one or more quantum access commands 146. The quantum processor 129 may be configured to initialize one or more qubits (e.g., the quantum bits 150). In certain embodiments, the quantum processor 129 may instruct the converter 123 to initialize the qubits. The quantum processor 129 may be configured to apply a Hadamard operator to the qubits to generate an initial quantum state. The quantum processor 129 applies an oracle operator and a diffusion operator to a current quantum state (e.g., initial quantum state). In certain embodiments, the oracle operator comprises a Pauli X gate.

The quantum processor 129 may determine if the oracle and diffusion operators are applied to the initial quantum state for a threshold number of times. In certain embodiments, the oracle and diffusion operators may be applied to the initial quantum state one or more times until the oracle and diffusion operators are applied to the initial quantum state for the threshold number of times.

In response to determining that the oracle and diffusion operators are applied to the initial quantum state for the threshold number of times, the quantum processor 129 may be configured to identify the current quantum state as a final quantum state. The quantum processor 129 may be configured to measure the final quantum state to determine one or more values as part of the quantum operations. In certain embodiments, the quantum processor 129 may be configured to instruct the converter 123 to measure the final quantum state.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the access feedback 134 comprising the metadata 136 and the one or more reports 138, the one or more assigned adverse impact thresholds 140, the one or more authentication operations 142, the one or more adverse impact assessments 144, the one or more quantum access commands 146 comprising one or more the quantum keys 148, the one or more quantum bits 150, the one or more requests 152, the user information 154 comprising the one or more user profiles 156 and the one or more entitlements 158, the one or more communication operations 104, the one or more AI commands 164, the one or more machine learning (ML) algorithms 166 configured to train the one or more models 168, and the one or more rules and policies 169. The instructions 132 may comprise any suitable set of instructions, logic, rules, or code operable to execute the classical processor 128. Further, the instructions 132 may comprise the one or more quantum algorithms comprising any suitable set of software instructions, logic, rules, or code operable to be executed by the quantum processor 129.

The one or more communication operations 104 may be one or more data exchanges performed between two or more network devices in the system 100. The network devices may comprise the server 102 and one or more of the user devices 106 among others. In one or more embodiments, the communication operations 104 may be audio communications exchanged as part of audio conversations (e.g., during a telephonic call) between two or more network devices. The communication operations 104 may be image and/or text communications exchanged as part of image-based conversations (e.g., during videocalls and/or chat exchanges) between two or more network devices.

The access feedback 134 may comprise metadata 136 and one or more reports 138. The access feedback 134 may comprise information provided by and/or obtained from the user devices 106 during one or more communication operations 104. The server 102 may be configured to perform one or more retrieving operations configured to determine metadata 136 from the communication operations 104 and generate one or more reports 138 associated with interactions of the user devices 106 in the network 110. The access feedback 134 may be provided continuously and/or periodically over time. The access feedback 134 may be data indicating whether any of the user devices 106 are attempting to perform one or more specific data exchange operations in the network 110. The access feedback 134 may be obtained via an acoustic adverse impact listener doppler model configured with a natural language processing (NPL) that identifies any kind of possible adverse impacts based on input audio related to fraudulent activities or crime within the network 110. The access feedback 134 may comprise multiple sound data samples. Each sound data sample may comprise a magnitude and a duration. The access feedback 134 may be configured to indicate one or more attempted actions associated with the communication operations 104. The access feedback 134 may indicate one or more changes in the behavior associated with one or more of the user devices 106. In one or more embodiments, the application metadata 136 is information data representative on one or more communication operations 104 performed and/or triggered by the one or more user devices 106. The metadata 136 may be data that represents extracted information and/or summarized information associated with one or more operations attempted and/or performed by the user devices 106. In the example of FIG. 1, the application metadata 136 may be active metadata comprising business metadata and/or passive metadata comprising technical metadata. The active metadata may be metadata used by one of the applications and may be dynamic in nature. The passive metadata may be metadata collected from the applications during one or more application operations and may be static in nature. In one or more embodiments, the reports 138 comprise one or more communications and/or transmissions configured to provide information relating to a status of one or more of the communication operations 104. The reports 170 may comprise and/or trigger alerts to other servers and/or one or more of the user devices 106.

The assigned adverse impact thresholds 140 may be one or more specific numbers and/or number ranges associated with a specific parameter and/or indicator. The assigned adverse impact thresholds 140 may be a specific value representing a higher boundary or a lower boundary. The assigned adverse impact thresholds 140 may be one or more threshold ranges comprising higher boundaries and lower boundaries. The assigned adverse impact thresholds 140 may be a percentage value representing a similarity and/or a difference between tracked activity 252 and/or predicted activity 254. The assigned adverse impact thresholds 140 may be determined based on information associated with the communication operations 104. The assigned adverse impact thresholds 140 may be determined dynamically over time. The assigned adverse impact thresholds 140 may be predefined and/or predetermined in accordance with information in activity associated with one or more of the communication operations 104. In some embodiments, the server 102 may be configured to calculate the assigned adverse impact thresholds 140 based on information obtained via the server I/O interfaces 127 and/or device interfaces 182.

The authentication operations 142 may be one or more operations executed by the classical processor 128 configured to enable data objects to be exchanged between the user devices 106 and/or the server 102. In one or more embodiments, the authentication operations 142 may be configured to indicate one or more data objects (e.g., via the communication operations 104) to be exchanged between the server 102 and at least one of the user devices 106. The authentication operations 142 may be configured to generate and analyze one or more communication operations 104 to confirm whether one or more entities associated with communication operations 104 are legitimately associated with at least one of the user devices 106. The authentication operations 142 may be one or more operations in which the server 102 is configured to confirm whether one or more communication operations 104 belong to a specific user device 106.

The one or more adverse impact assessments 144 may be data elements configured to indicate one or more possible adverse impacts (e.g., risks) comprising one or more indicators of possible adverse changes to the surroundings of a given communication operation 104 performed by an entity. The adverse impact assessments 144 may be determined as results of the one or more authentication operations 142. The adverse impact assessments 144 may be generated along the quantum access commands 146. In response, the server 102 may be configured to mitigate, reduce, and/or eliminate the adverse impacts in the adverse impact assessments 144. In one or more embodiments, the adverse impact assessments 144 may comprise one or more warning commands indicating a potential exposure of resources associated with the one or more entitlements 158 and/or other sensitive data.

The one or more quantum access commands 146 may be one or more indicators configured to provide information associated with one or more operations of the entities accessing the network 110. The quantum access commands 146 may be stored in one or more quantum formats. The quantum processor 129 may be configured to generate the one or more quantum access commands 146 based on access feedback 134. In this regard, the quantum access commands 146 may be information indicating modifications and/or assignments of resources in the network 110. The quantum access commands 146 may be replaced, updated, and/or modified dynamically. The quantum access commands 146 may be replaced, updated, and/or modified periodically. The quantum access commands 146 may comprise results of one or more operations of the processing engine configured to perform as authentication operations 142 that retrieve and analyze the access feedback 134. The quantum access commands 146 may comprise one or more quantum keys 148 generated to verify an identity of the one or more entities. The quantum access commands 146 may be one or more triggers configured to enable access between a user device 106 determined to perform one or more legitimate communication operations 104. The one or more quantum keys 148 The quantum access commands 146 may be quantum access commands generated by the quantum processor 129 configured to generate quantum keys 148 comprising one or more quantum states. The quantum keys 148 may be passkeys, passwords, communication strings, alphanumeric characters, and/or data elements comprising one or more quantum encryptions.

The quantum bits 150 (e.g., qubits) may be quantum elements of data configured to be stored to interact with the quantum processor 129 in one or more quantum states. The quantum processor 129 may not rely on mathematical algorithms but on laws of quantum physics to generate true random numbers and provide high security. Every alphanumeric data which is available in a source may assign with true random number may make data entry unique. The quantum processor 129 may comprise setting up the quantum bits 150 that exist in one of two alternative binary digits. The quantum bits 150 may be used to store the quantum keys 148 as part of the authentication operations 142. In some embodiments, quantum processor 129 may be configured to identify a true value of the quantum bits 150.

The requests 152 may be one or more communications configured to provide triggers in the form of communication or control signals to start operations such as fetching the instructions 132 or running one or more of the authentication operations 142. The requests 152 may provide user information 154 to the server 102 to indicate at least one user profile 156 associated with one or more of the entitlements 158 to access and/or modify any of the applications available in the server 102. In some embodiments, the requests 152 may be configured to provide lists, security information, and configuration commands that the server 102 uses to set up a specific service for one of the user devices 106. The requests 152 may comprise data that provides starting procedure configuration to the server 102. In one or more embodiments, the requests 152 may be optimized instructions that trigger establishing of a specific procedure in the server 102.

The user information 154 may comprise the one or more user profiles 156, one or more entitlements 158, and one or more services. In one or more embodiments, the user profiles 156 may comprise multiple profiles associated with one or more entitlements 158 to access and/or modify the services. Each of the user profiles 156 may be associated with one or more entitlements 158. The entitlements 158 may indicate that a given user device 106 is allowed to access one or more network resources in accordance with the one or more rules and policies 169. The entitlements 158 may indicate that a given user device 106 is allowed to perform one or more operations in the system 100 (e.g., provide a specific application data access to one of the users 116). To secure or protect operations of the user devices 106 from bad actors, the entitlements 158 may be assigned to a given user profile 156 in accordance with updated security information, which may provide guidance parameters to the use of the entitlements 158 based at least upon corresponding rules and policies 169. In one or more embodiments, the one or more services perform one or more application operations using the quantum access commands 146 and/or the quantum keys 148. In some embodiments, the user profiles 156 may comprise multiple profiles for the users 116. Each user profile 156 may comprise one or more entitlements 158. As described above, the entitlements 158 may indicate that a given user 116 is allowed to access one or more network resources in accordance with one or more rules and policies 169. The entitlements 158 may indicate that a given user 116 is allowed to perform one or more data exchanges with the server 102 via the network 110. In one or more embodiments, each of the user profiles 156 may comprise information about at least one user 116 entitled to trigger one or more communication operations 104.

In one or more embodiments, the ML algorithms 166 may be executed by the classical processor 128 to evaluate the communication operations 104 and/or the access feedback 134. Further, the ML algorithms 166 may be configured to interpret and transform the requests 152 and/or the instructions 132 into structured data sets and subsequently stored as files or tables. The ML algorithms 166 may cleanse, normalize raw data, and derive intermediate data to generate uniform data in terms of encoding, format, and data types. The ML algorithms 166 may be executed to run user queries and advanced analytical tools on the structured data and/or the unstructured data in accordance with one or more ML models 168. The ML algorithms 166 may be configured to generate the one or more AI commands 164 based on one or more results of the testing operations. The AI commands 164 may be parameters that proactively trigger one or more of the authentication operations 142. The AI commands 164 may be combined with the existing instructions 132 to dynamically trigger and/or perform the data authentication operations 104 and/or some or all of the communication operations 104. The AI commands 164 may be configured to trigger one or more cognitive AI operations in accordance with one or more ML models 168. The ML models 168 may be trained by the one or more ML algorithms 166 based on historic information associated with any authentication operations 142 performed with the server 102.

The rules and policies 169 may be security configuration commands or regulatory operations predefined by an organization or one or more users 116. In one or more embodiments, the rules and policies 169 may be dynamically defined by the one or more users 116. The rules and policies 169 may be prioritization rules configured to instruct one or more user devices 106 to perform one or more evaluating operations or perform one or more operations in the system 100 in a specific communication operations 104. The one or more rules and policies 169 may be predetermined or dynamically assigned by a corresponding user 116 or an organization associated with the users 116.

In one or more embodiments, the databases 126 may be one or more repositories configured to store information. In one example, the server 102 may determine the classical processor 128 and/or the quantum processor 129 are available (e.g., running) to perform a specific service. In another example, the server 102 may determine that a specific managed server is running to enable a testing application and/or perform the specific service upon receiving a server response indicating that a corresponding managed server is available to perform the service. The databases 126 may be configured to store one or more representations of data instead of storing coded data. In this regard, the representations may be encoded in accordance with an encoder configured to identify and/or verify exchanged information. For example, the databases 126 may comprise one or more representations of the access feedback 134 and/or the quantum access commands 146. As the access feedback 134 is obtained, the classical processor 128 may be configured to process the access feedback 134 in accordance with the one or more authentication operations 142.

User Device

In one or more embodiments, each of the user devices 106 (e.g., the user device 106*a*, the user devices 106*b*-106*d* in the user device group 112) may be any computing device configured to communicate with other devices, such as the server 102, other user devices 106 in the user device group 112, databases, and the like in the system 100. Each of the user devices 106 may be configured to perform specific functions described herein and interact with the server 102 and/or any other user devices 106. Examples of the user devices 106 comprise, but are not limited to, a laptop, a computer, a smartphone, a tablet, a smart device, an IoT device, a simulated reality device, an augmented reality device, or any other suitable type of device. The requests 152 may be provided by the user devices 106 via one or more interfaces comprising input displays, voice microphones, or sensors capturing gestures performed by a corresponding user 116.

The user devices 106 may be hardware configured to create, transmit, and/or receive information. The user devices 106 may be configured as a provider node or as worker nodes. The user devices 106 may be configured to receive inputs from a user, process the inputs, and generate data information or command information in response. The data information may include documents or files generated using a graphical user interface (GUI).

Referring to the user device 106*a* as a non-limiting example, the command information may include input selections/commands triggered by a user using a peripheral component or one or more device peripherals 184 (i.e., a keyboard) or an integrated input system (i.e., a touchscreen displaying the GUI). The user devices 106 may be communicatively coupled to the server 102 via a network connection (i.e., the device peripherals 184). The user devices 106 may transmit and receive data information, command information, or a combination of both to and from the server 102 via the device interfaces 182. In one or more embodiments, the user devices 106 are configured to exchange data, commands, and signaling with the server 102. In some embodiments, the user devices 106 are configured to receive at least one security system configuration from the server 102 to implement a security system (one of the one or more local applications 192) at one of the user devices 106.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional user devices 106, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user devices 106. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions.

The device memory 188 may comprise multiple operation data and one or more local applications 192 associated with the server 102. The operation data may be data configured to enable one or more data processing operations such as those described in relation with the server 102. The operation data may be partially or completely different from those comprised in the memory 130. The local applications 192 may be one or more of the services described in relation with the server 102. In some embodiments, the local applications 192 may be partially or completely different from those comprised in the memory 130.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Electronic Attacker

In one or more embodiments, electronic attackers 118 may be any electronic device that influences the operations of one or more devices in the network 110. In some embodiments, the electronic attacker group 120 comprises multiple devices configured to interfere with operations of devices in the network 110. The attacker group 120 comprises the electronic attacker 118*b*, the electronic attacker 118*c*, and the electronic attacker 118*d*. Each of the electronic attackers may perform one or more attacks 122 (e.g., attacks 122*a* and attacks 122*b*).

The electronic attacks 122 may be one or more unexpected operations triggered by the electronic attackers 118 in the network 110. In some embodiments, a single electronic attacker 118 may perform one or more attacks 122*a*. In other embodiments, multiple electronic attackers 118 (e.g., the attacker 118*b*, the attacker 118*b*, and the attacker 118*d* in the attacker group 120) may perform one or more attacks 122*b*.

Referring as a non-limiting example to the electronic attacker 118*a* of FIG. 1, the electronic attacker 118*a* may be hardware and/or software, executed by hardware, that launches the attacks 122*a* to affect the operations performed by the server 102 and/or the user devices 106. Although not explicitly shown in FIG. 1, the electronic attacker 118*a* may include a processor, a memory, and a transceiver configured to generate one or more communication signals. In one or more embodiments, the electronic attacker 118*a* is a new device in a predetermined area in which the server 102 and/or the user devices 106 are located. In some embodiments, radio waves, electromagnetic (EM) signaling, and/or communication operations 104 from the electronic attacker 118*a* are monitored over time in the network 110 to be evaluated in combination with one or more authentication operations 142.

In one or more embodiments, the electronic attacker 118*a* may be a person, people, or an automated electric component that use the attacks 122*a* to hack communications and operations of a specific user device 106 and/or the server 102. As a result of the attacks 122*a*, the electronic attacker 118*a* may control communications or operations of one or more of the hacked user device 106. In this regard, the electronic attacker 118*a* may modify, cancel, or generate communications or operations in the hacked user devices 106. The electronic attacker 118*a* may pretend to perform one or more operations on behalf of one or more of the user devices 106.

Operational Flow to Evaluate Communication Operations

FIG. 2 shows an operational flow 200 in which the system 100 of FIG. 1 is configured to evaluate communication operations 104, in accordance with one or more embodiments. In FIG. 2, the operational flow 200 comprises multiple operations 202-220. The operational flow 200 may be performed between the server 102 and one or more entities to determine whether the entities are one of more of the user devices 106 or one or more of the electronic attackers 118. The operational flow 200 shows classical layer operations 202 comprising one or more services 232 and one or more managed servers 234 (e.g., a managed server 234*a* and a managed server 234*b*), one or more access security operations 206 comprising one or more supervised models 242, one or more unsupervised models 244, the one or more quantum access commands 146, evaluation data 246, and one or more secure databases 248 comprising historical data 250, tracked activity 252, and predicted activity 254. The operational flow 200 shows the meddling detection operations 220 comprising one or more legitimate requests 262, detected threats 264, system alerts 266, and one or more training controls 268. In the example of FIG. 2, the classical layer operations 202 may generate one or more data elements 270 to perform the one or more access security operations 206 and receive one or more responses 274 from the security operations 206. In turn, the security operations 206 may generate one or more triggers 276 to perform the one or more meddling detection operations 220 and receive one or more data elements 278 from the meddling detection operations 220. In some embodiments, the meddling detection operations 220 and the classical layer operations 202 may be performed after causing one or more data exchanges 280.

The classical layer operations 202 may comprise one or more operations performed by the classical processor 128. In one or more embodiments, the classical layer operations 202 may comprise loading the metadata 136 from the user devices 106 on startup and evaluating one or more credentials associated with one or more entities attempting to access the network 110 as user devices 106. The entities may be a legitimate user device 106 or an electronic attacker 118 pretending to be one of the user devices 106. In the classical layer operations 202, the server 102 may be configured to invoke the AI commands 164 and/or the ML algorithms 166 to evaluate one or more communication operations 104 from an entity attempting to access network resources in the system 100. The server 102 may be configured to provide one or more data elements 272 as outputs to the access security operations 206. The classical layer operations 202 may be one or more operations configured to provide access between a legitimate user device 106 and one or more services 232 (e.g., applications). The services 232 may be configured to provide access to one or more network resources in the network 110 via the server 102 and/or one or more managed servers 234. The one or more managed servers The access security operations 206 may comprise one or more operations performed by the classical processor 128 and/or the quantum processor 129. The access security operations 206 may comprise the one or more ML models 168. The access security operations 206 may comprise one or more operations using one or more supervised models 242, the unsupervised models 244, the quantum access commands 146, the evaluation data 246, and the security databases 248. The security databases 248 comprise the historical data 250, the tracked activity 252, and the predicted activity 254. The supervised models 242 may be one or more ML models 168 configured to evaluate tracked activity 252 and predicted activity 254 associated with one or more user devices 106 against specific historical data 250. The specific historical data 250 may be information associated with specific user information 154 associated with a specific user profile 156. The unsupervised models 244 may be one or more ML models 168 configured to evaluate tracked activity 252 and predicted activity 254 associated with one or more user devices 106 against general historical data 250. The general historical data 250 may be information associated with generalized user information 154 that is not associated with a specific user profile 156. The evaluation data 246 may be one or more processed versions of the data elements 272 received from the classical layer operations 202. The evaluation data 246 may be one or more of the access feedback 134. The evaluation data 250 may be some of the information used to train the ML algorithms 166, the supervised models 242, and/or the unsupervised models 244.

In some embodiments, as the access feedback 134 is collected, the classical processor 128 and/or the quantum processor 129 may be configured to authenticate an entity attempting to access the network 110 using the supervised models 242 and/or the unsupervised models 244. In the access security operations 206, the classical processor 128 and/or the quantum processor 129 may be configured to detect threats, announce the threats over the network 110, and send alerts about the threats. The classical processor 128 and/or the quantum processor 129 may be configured to obtain specific tracked activity 252 from the access feedback 134 and generate predicted activity 254 based on historical data 250 associated with a specific user profile 156. Herein, in accordance with the supervised models 242 or the unsupervised models 244, the classical processor 128 and/or the quantum processor 129 may be configured to determine whether an entity attempting to access the user devices 106 is behaving as expected. A given entity is determined to behave as expected if the tracked activity 252 matches the predicted activity 254 for a given entity. A given entity is determined to not behave as expected if the tracked activity 252 does not match the predicted activity 254 for a given entity. The classical processor 128 and/or the quantum processor 129 may be configured to monitor and visualize the communication operations 104 performed by the user devices 106. The classical processor 128 and/or the quantum processor 129 may be configured to evaluate the evaluation data 246 and the security databases 248 in a data lake. The classical processor 128 and/or the quantum processor 129 may be configured to determine one or more possible adverse impacts and corresponding adverse impact assessments 144 from communication operations 104 performed by a given entity. As described above, the adverse impact assessments 144 may be performed in accordance with one or more assigned adverse impact thresholds 140. In some embodiments, the adverse impact assessments 144 may be generated as outputs after processing the access feedback 134 in accordance with supervised models 242 or unsupervised models 244. In some embodiments, the access security operations 206 may be configured to generate the one or more quantum keys 148 if the communication operations 104 are determined to be acceptable by the server 102. The predicted activity 254 may be generated based on the historical data 250 and the tracked activity 252. The access security operations 206 may generate one or more responses 274 as outputs to the classical layer operations 202 where the server 102 is configured to perform one or more data exchanges 280 with the meddling detection operations 220. The access security operations 206 may provide one or more triggers 276 to the meddling detection operations 220 and receive one or more data elements 278 in response from the meddling detection operations 220.

In one or more operations, the classical layer operations 202 may function as a first layer of security in which credentials for a given user device 106 are evaluated and approved in accordance with encryption operations. The access security operations 206 may function as a second layer of security in which the communication operations 104 associated with the given user device 106 are authenticated using the quantum processor 129 and the multiple ML models 168. At this stage, the server 102 may be configured to provide the quantum keys 148 to the user devices 106 as a preliminary quantum access to the network resources. In turn, the meddling detection operations 220 may function as a third layer of security in which quantum keys 148 of the access security operations 206 may be confirmed in the network 110.

The meddling detection operations 220 may comprise operations configured to ensure message accuracy from start to end. The meddling detection operations 220 may be configured to capture any meddling efforts by measurements and stop these efforts and keep databases secure. The meddling detection operations 220 may be configured to receive the quantum keys 148 from the user devices 106 and confirm whether the received quantum keys 148 match those generated by the access security operations 206 (e.g., match the one or more quantum bits 150 used to generate the quantum keys 148). The meddling detection operations 220 may be configured to approve or disapprove access attempts. In this regard, if the quantum keys 148 received from the user devices 106 are determined to be inaccurate, the server 102 is configured to deny access to the network resources. Further, if the quantum keys 148 received from the user devices 106 are determined to be accurate, the server 102 is configured to grant access to the network resources. The meddling detection operations 220 may be configured to identify one or more legitimate requests 262 to access the network resources. The meddling detection operations 220 may be configured to use detected threats 264 and system alerts 266 to create one or more training controls 268 for the ML algorithm 166.

Example Process to Evaluate Communication Operations

FIG. 3 illustrates an example flowchart of a process 300 configured to dynamically abbreviate data, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the user devices 106, or components of any of thereof performing operations described in operations 302-336 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer readable medium such as memory 130 of FIG. 1) that when run by one or more processors (e.g., the classical processor 128 of FIG. 1) may cause the one or more processors to perform operations described in operations 302-336.

The server 102 may be configured to evaluate communication operations 104 performed by a user device 106 and determining whether the user device 106 is behaving as expected while attempting to access network resources. Herein, the server 102 is configured to track current communication operations 104 performed by a specific user device 106 in the network 110. Further, the server 102 is configured to implement quantum AI/ML methodologies to determine whether the communication operations 104 performed by the user devices 106 are within an assigned adverse impact threshold 140 of reasonable operations for the specific user device 106. The server 102 uses a supervised model 242 and an unsupervised model 244 to review operations in currently performed by the user devices 106. If the user device 106 is a new user device 106 or the user device 106 is performing tasks that are new and/or unrelated to one of the user profiles 156, the unsupervised model 244 reviews the actions and evaluates whether these actions are reasonable within behavior of the average user device 106. Over time, the behavior of the user device 106 may be fed to the supervised model 242. In the supervised model 242, the actions of the user devices 106 are determined to be reasonable after being compared to the previous actions (e.g., the historical data 250 and/or the tracked activity 252) associated with a corresponding user profile 156. Under any ML model 168, secure information is processed using a quantum engine (e.g., executed by the quantum processor 129) that is configured to perform in-memory encryption of data in a data lake storing indicators of historical data of users. At any point, if the user behavior does not match the expected behavior as dynamically predicted by the quantum AI/ML system, the communication operations may be stopped, and a report/alert (e.g., one or more of the system alerts 266) may be generated indicating that the user device 106 is not legitimate.

The server 102 may be configured to evaluate command tampering (e.g., the quantum keys 148) as requests for data are received by a network 110. The server 102 may be configured to receive the quantum keys 148 from a user device 106, filter the quantum keys 148 in accordance with a predefined sequence, and determine whether the quantum keys 148 received is authentic. The quantum keys 148 may be part of quantum access commands 146 that would be disorganized if an attack **122*a* were to be performed. In this regard, a sequence forming a quantum key 148 may be destroyed if a bad actor (e.g., one of the electronic attackers 118) were to intervene in command transfers. If the quantum keys 148 is organized as expected, the quantum access commands 146 and any associated data may be processed along communication operations 104 of the user devices 106 into indicators to track overall user activity (e.g., the tracked activity 252) in the network 110. At any point, if the sequence of the quantum key 148 does not match the expected sequence, the command intake may be stopped, and a report/alert may be generated indicating that the command is not legitimate. In the database, the indicators are not raw data. After the user behavior is converted to indicators, these indicators are matched to a specific user profile and a general user profile provided to a data lake configured to structure the data in accordance with one or more ML models 168. The specific user profile 156 is representative of behavior that is specific to a given user device 106. The general user profile 156 is representative of behavior that is common for people sharing one or more similarities with the specific user device 106**.

The process 300 starts at operation 302, where the server 102 receive access feedback 134 from an entity requesting to access one or more network resources in a communication network 110. At operation 304, the server 102 is configured to execute a machine learning algorithm 166 to monitor the access feedback 134 in the communication network for a period of time. At operation 306, the server 102 is configured to determine multiple tracked activities 252 and metadata 136 from the access feedback 134. The machine learning algorithm 166 may be configured, when executed, to evaluate data in accordance with one or more machine learning models 168. At operation 308, the server 102 is configured to generate predicted activities 254 based on the metadata 136.

At operation 310, the server 102 is configured to determine whether the tracked activities 252 match the predicted activities 254 within an assigned adverse impact threshold 140. If the server 102 determines that the tracked activities 252 do not match the predicted activities 254 within the assigned adverse impact threshold 140 (e.g., NO), the process 300 proceeds to operation 322. The process 300 may conclude at operation 322, where the server 102 is configured to determine that the entity is not allowed to access resources in the communication network 110. If the server 102 determines that the tracked activities 252 match the predicted activities 254 within the assigned adverse impact threshold 140 (e.g., YES), the process 300 proceeds to operation 332. At operation 332, the server 102 is configured to generate an adverse impact assessment 144 granting preliminary access between the entity and the one or more network resources.

The process 300 may end at operation 334 and operation 336, where the server 102 may be configured to generate and distribute one or more quantum access commands 146. At operation 334, the server 102 is configured to create a quantum access command 146 for the entity. The quantum access command 146 may comprise one or more quantum keys 148 to access the one or more network resources. At operation 336, the server 102 is configured to provide the quantum access command 146 to the entity.

In some embodiments, the server 102 may be configured to determine whether the one or more quantum keys 148 in the quantum access command 147 match the one or more quantum bits 150. In response to determining that the one or more quantum keys 148 in the quantum access command 146 match the one or more quantum bits 150, the server 102 is configured to determine that the quantum access command 146 is authentic. The server 102 may be configured to provide access between the entity and the one or more network resources. In response to determining that the one or more quantum keys 148 in the quantum access command 146 do not match the one or more quantum bits 150, the server 102 is configured to determine that the quantum access command 146 is not authentic. The server 102 may be configured to deny access between the entity and the one or more network resources.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:

a memory operable to store:

a machine learning algorithm configured, when executed, to evaluate data in accordance with one or more machine learning models; and at least one processor communicatively coupled to the memory and configured to:

receive, during a first authentication operation, first access feedback from a first user device requesting to access one or more network resources in a communication network;

train, using the first access feedback and historic information associated with authentication operations, a machine learning model to predict user device actions, and operations in the communication network;

monitor, using the machine learning algorithm in accordance with the trained machine learning model, operations triggered in the communication network after receiving the first access feedback for a first period of time;

determine, using the machine learning algorithm in accordance with the trained machine learning model, a first plurality of tracked activities and first metadata triggered after receiving the first access feedback;

in response to determining the first plurality of tracked activities and the first metadata triggered after receiving the first access feedback, generate, using the machine learning algorithm in accordance with the trained machine learning model, a first plurality of predicted activities based on the first metadata;

determine, using the machine learning algorithm in accordance with the trained machine learning model, whether the first plurality of tracked activities matches the first plurality of predicted activities within a first predefined adverse impact threshold;

in response to determining that the first plurality of tracked activities matches the first plurality of predicted activities within the first predefined adverse impact threshold, generate, using the machine learning algorithm in accordance with the trained machine learning model, a first adverse impact assessment granting preliminary access between the first user device and the one or more network resources;

create a first quantum access command for the first user device, the first quantum access command comprising one or more first keys to access the one or more network resources; and provide the first quantum access command to the first user device.

2. The system of claim 1, wherein the at least one processor is further configured to:

after a second period of time, receive a first request from the first user device comprising the first quantum access command;

evaluate, using the machine learning algorithm in accordance with the trained machine learning model, the one or more first keys in the first quantum access command against one or more qubits;

determine, using the machine learning algorithm in accordance with the trained machine learning model, whether the one or more first keys in the first quantum access command match the one or more qubits;

in response to determining that the one or more first keys in the first quantum access command match the one or more qubits, determine, using the machine learning algorithm in accordance with the trained machine learning model, that the first quantum access command is authentic; and provide access between the first user device and the one or more network resources.

3. The system of claim 1, wherein the at least one processor is further configured to:

after a second period of time, receive a first request from the first user device comprising the first quantum access command;

evaluate, using the machine learning algorithm in accordance with the trained machine learning model, the one or more first keys in the first quantum access command against one or more qubits;

determine, using the machine learning algorithm in accordance with the trained machine learning model, whether the one or more first keys in the first quantum access command match the one or more qubits;

in response to determining that the one or more first keys in the first quantum access command do not match the one or more qubits, determine, using the machine learning algorithm in accordance with the trained machine learning model, that the first quantum access command is not authentic; and deny access between the first user device and the one or more network resources.

4. The system of claim 1, wherein the at least one processor is further configured to:

receive, during a second authentication operation, second access feedback from a second user device requesting to access the one or more network resources in the communication network;

train, using the second access feedback and the historic information associated with the authentication operations, the machine learning model to predict the user device actions and the operations in the communication network;

monitor, using the machine learning algorithm in accordance with the trained machine learning model, operations triggered in the communication network after receiving the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources;

create a second quantum access command for the second user device, the second quantum access command comprising one or more second keys to access the one or more network resources; and provide the second quantum access command to the second user device.

5. The system of claim 1, wherein the at least one processor is further configured to:

receive, during a second authentication operation, second access feedback from a second user device requesting to access the one or more network resources in the communication network;

determine, using the machine learning algorithm in accordance with the trained machine learning model, whether the second user device is associated with historical data in the communication network, the historical data indicating whether the second user device is previously associated with the communication network;

in response to determining that the second user device is associated with the historical data, train, using the second access feedback and the historic information associated with the authentication operations, the machine learning model to predict the user device actions and the operations in the communication network;

monitor, using the machine learning algorithm in accordance with the trained machine learning model, the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata and the historical data;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources; and create a second quantum access command for the second user device, the second quantum access command comprising one or more second keys to access the one or more network resources; and provide the second quantum access command to the second user device.

6. The system of claim 1, the at least one processor is further configured to:

receive, during a second authentication operation, second access feedback from a second user device requesting to access the one or more network resources in the communication network;

determine, using the machine learning algorithm in accordance with the trained machine learning model, whether the second user device is associated with historical data in the communication network, the historical data indicating whether the second user device is previously associated with the communication network;

in response to determining that the second user device is not associated with the historical data, train, using the second access feedback and the historic information associated with the authentication operations, the machine learning model to predict the user device actions and the operations in the communication network;

monitor, using the machine learning algorithm in accordance with the trained machine learning model, the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources; and create a second quantum access command for the second user device, the second quantum access command comprising one or more second keys to access the one or more network resources;

provide the second quantum access command to the second user device; and store the second plurality of predicted activities as historical data associated with the second user device.

7. The system of claim 6, wherein the at least one processor is further configured to:

store the second plurality of predicted activities as historical data associated with the second user device in accordance with one or more quantum encryption protocols.

8. A method, comprising:

receiving, during a first authentication operation, first access feedback from a first user device requesting to access one or more network resources in a communication network;

training, using the first access feedback and historic information associated with authentication operations, a machine learning model to predict user device actions, and operations in the communication network;

monitoring, using a machine learning algorithm in accordance with the trained machine learning model, operations triggered in the communication network after receiving the first access feedback for a first period of time;

determining, using the machine learning algorithm in accordance with the trained machine learning model, a first plurality of tracked activities and first metadata triggered after receiving the first access feedback;

generating, using the machine learning algorithm in accordance with the trained machine learning model, a first plurality of predicted activities based on the first metadata;

determining, using the machine learning algorithm in accordance with the trained machine learning model, whether the first plurality of tracked activities matches the first plurality of predicted activities within a first predefined adverse impact threshold;

in response to determining that the first plurality of tracked activities matches the first plurality of predicted activities within the first predefined adverse impact threshold, generating, using the machine learning algorithm in accordance with the trained machine learning model, a first adverse impact assessment granting preliminary access between the first user device and the one or more network resources;

creating a first quantum access command for the first user device, the first quantum access command comprising one or more first keys to access the one or more network resources; and providing the first quantum access command to the first user device.

9. The method of claim 8, further comprising:

after a second period of time, receiving a first request from the first user device comprising the first quantum access command;

evaluating, using the machine learning algorithm in accordance with the trained machine learning model, the one or more first keys in the first quantum access command against one or more qubits;

determining, using the machine learning algorithm in accordance with the trained machine learning model, whether the one or more first keys in the first quantum access command match the one or more qubits;

in response to determining that the one or more first keys in the first quantum access command match the one or more qubits, determining, using the machine learning algorithm in accordance with the trained machine learning model, that the first quantum access command is authentic; and providing access between the first user device and the one or more network resources.

10. The method of claim 8, further comprising:

after a second period of time, receiving a first request from the first user device comprising the first quantum access command;

evaluating, using the machine learning algorithm in accordance with the trained machine learning model, the one or more first keys in the first quantum access command against one or more qubits;

determining, using the machine learning algorithm in accordance with the trained machine learning model, whether the one or more first keys in the first quantum access command match the one or more qubits;

in response to determining that the one or more first keys in the first quantum access command do not match the one or more qubits, determining, using the machine learning algorithm in accordance with the trained machine learning model, that the first quantum access command is not authentic; and denying access between the first user device and the one or more network resources.

11. The method of claim 8, further comprising:

receiving, during a second authentication operation, second access feedback from a second user device requesting to access the one or more network resources in the communication network;

training, using the second access feedback and the historic information associated with the authentication operations, the machine learning model to predict the user device actions and the operations in the communication network;

monitoring, using the machine learning algorithm in accordance with the trained machine learning model, operations triggered in the communication network after receiving the second access feedback for a second period of time;

determining, using the machine learning algorithm in accordance with the trained machine learning model, a second plurality of tracked activities and second metadata triggered after receiving the second access feedback;

generating, using the machine learning algorithm in accordance with the trained machine learning model, a second plurality of predicted activities based on the second metadata;

determining, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generating, using the machine learning algorithm in accordance with the trained machine learning model, a second adverse impact assessment granting preliminary access between the second user device and the one or more network resources;

creating a second quantum access command for the second user device, the second quantum access command comprising one or more second keys to access the one or more network resources; and providing the second quantum access command to the second user device.

12. The method of claim 8, further comprising:

receiving, during a second authentication operation, second access feedback from a second user device requesting to access the one or more network resources in the communication network;

determining, using the machine learning algorithm in accordance with the trained machine learning model, whether the second user device is associated with historical data in the communication network, the historical data indicating whether the second user device is previously associated with the communication network;

in response to determining that the second user device is associated with the historical data, training, using the second access feedback and the historic information associated with the authentication operations, the machine learning model to predict the user device actions and the operations in the communication network;

monitoring, using the machine learning algorithm in accordance with the trained machine learning model, the second access feedback for a second period of time;

determining, using the machine learning algorithm in accordance with the trained machine learning model, a second plurality of tracked activities and second metadata triggered after receiving the second access feedback;

generating, using the machine learning algorithm in accordance with the trained machine learning model, a second plurality of predicted activities based on the second metadata and the historical data;

determining, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generating, using the machine learning algorithm in accordance with the trained machine learning model, a second adverse impact assessment granting preliminary access between the second user device and the one or more network resources;

creating a second quantum access command for the second user device, the second quantum access command comprising one or more second keys to access the one or more network resources; and providing the second quantum access command to the second user device.

13. The method of claim 8, further comprising:

receiving, during a second authentication operation, second access feedback from a second user device requesting to access the one or more network resources in the communication network;

determining, using the machine learning algorithm in accordance with the trained machine learning model, whether the second user device is associated with historical data in the communication network, the historical data indicating whether the second user device is previously associated with the communication network;

in response to determining that the second user device is not associated with the historical data, training, using the second access feedback and the historic information associated with the authentication operations, the machine learning model to predict the user device actions and the operations in the communication network;

monitoring, using the machine learning algorithm in accordance with the trained machine learning model, the second access feedback for a second period of time;

determining, using the machine learning algorithm in accordance with the trained machine learning model, a second plurality of tracked activities and second metadata triggered after receiving the second access feedback;

generating, using the machine learning algorithm in accordance with the trained machine learning model, a second plurality of predicted activities based on the second metadata;

determining, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generating, using the machine learning algorithm in accordance with the trained machine learning model, a second adverse impact assessment granting preliminary access between the second user device and the one or more network resources;

creating a second quantum access command for the second user device, the second quantum access command comprising one or more second keys to access the one or more network resources;

providing the second quantum access command to the second user device; and storing the second plurality of predicted activities as historical data associated with the second user device.

14. The method of claim 13, further comprising:

storing the second plurality of predicted activities as historical data associated with the second user device in accordance with one or more quantum encryption protocols.

15. A non-transitory computer-readable medium storing instructions that when executed by a processor cause the processor to:

receive, during a first authentication operation, first access feedback from a first user device requesting to access one or more network resources in a communication network;

train, using the first access feedback and historic information associated with authentication operations, a machine learning model to predict user device actions, and operations in the communication network;

monitor, using a machine learning algorithm in accordance with the trained machine learning model, operations triggered in the communication network after receiving the first access feedback for a first period of time;

determine, using the machine learning algorithm in accordance with the trained machine learning model, a first plurality of tracked activities and first metadata triggered after receiving the first access feedback;

generate, using the machine learning algorithm in accordance with the trained machine learning model, a first plurality of predicted activities based on the first metadata;

determine, using the machine learning algorithm in accordance with the trained machine learning model, whether the first plurality of tracked activities matches the first plurality of predicted activities within a first predefined adverse impact threshold;

in response to determining that the first plurality of tracked activities matches the first plurality of predicted activities within the first predefined adverse impact threshold, generate, using the machine learning algorithm in accordance with the trained machine learning model, a first adverse impact assessment granting preliminary access between the first user device and the one or more network resources;

create a first quantum access command for the first user device, the first quantum access command comprising one or more first keys to access the one or more network resources; and provide the first quantum access command to the first user device.

16. The non-transitory computer-readable medium of claim 15, wherein, when executed by the processor, the instructions further cause the processor to:

after a second period of time, receive a first request from the first user device comprising the first quantum access command;

evaluate, using the machine learning algorithm in accordance with the trained machine learning model, the one or more first keys in the first quantum access command against one or more qubits;

determine, using the machine learning algorithm in accordance with the trained machine learning model, whether the one or more first keys in the first quantum access command match the one or more qubits;

in response to determining that the one or more first keys in the first quantum access command match the one or more qubits, determine, using the machine learning algorithm in accordance with the trained machine learning model, that the first quantum access command is authentic; and provide access between the first user device and the one or more network resources.

17. The non-transitory computer-readable medium of claim 15, wherein, when executed by the processor, the instructions further cause the processor to:

after a second period of time, receive a first request from the first user device comprising the first quantum access command;

evaluate, using the machine learning algorithm in accordance with the trained machine learning model, the one or more first keys in the first quantum access command against one or more qubits;

determine, using the machine learning algorithm in accordance with the trained machine learning model, whether the one or more first keys in the first quantum access command match the one or more qubits;

in response to determining that the one or more first keys in the first quantum access command do not match the one or more qubits, determine, using the machine learning algorithm in accordance with the trained machine learning model, that the first quantum access command is not authentic; and deny access between the first user device and the one or more network resources.

18. The non-transitory computer-readable medium of claim 15, wherein, when executed by the processor, the instructions further cause the processor to:

receive, during a second authentication operation, second access feedback from a second user device requesting to access the one or more network resources in the communication network;

train, using the second access feedback and the historic information associated with the authentication operations, the machine learning model to predict the user device actions and the operations in the communication network;

monitor, using the machine learning algorithm in accordance with the trained machine learning model, operations triggered in the communication network after receiving the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources;

create a second quantum access command for the second user device, the second quantum access command comprising one or more second keys to access the one or more network resources; and provide the second quantum access command to the second user device.

19. The non-transitory computer-readable medium of claim 15, wherein, when executed by the processor, the instructions further cause the processor to:

receive, during a second authentication operation, second access feedback from a second user device requesting to access the one or more network resources in the communication network;

determine, using the machine learning algorithm in accordance with the trained machine learning model, whether the second user device is associated with historical data in the communication network, the historical data indicating whether the second user device is previously associated with the communication network;

in response to determining that the second user device is associated with the historical data, train, using the second access feedback and the historic information associated with the authentication operations, the machine learning model to predict the user device actions and the operations in the communication network;

monitor, using the machine learning algorithm in accordance with the trained machine learning model, the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata and the historical data;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources; and create a second quantum access command for the second user device, the second quantum access command comprising one or more second keys to access the one or more network resources; and provide the second quantum access command to the second user device.

20. The non-transitory computer-readable medium of claim 15, wherein:

receive, during a second authentication operation, second access feedback from a second user device requesting to access the one or more network resources in the communication network;

determine, using the machine learning algorithm in accordance with the trained machine learning model, whether the second user device is associated with historical data in the communication network, the historical data indicating whether the second user device is previously associated with the communication network;

in response to determining that the second user device is not associated with the historical data, train, using the second access feedback and the historic information associated with the authentication operations, the machine learning model to predict the user device actions and the operations in the communication network;

monitor, using the machine learning algorithm in accordance with the trained machine learning model, the second access feedback for a second period of time;

determine, using the machine learning algorithm in accordance with the trained machine learning model, a second plurality of tracked activities and second metadata triggered after receiving the second access feedback;

generate, using the machine learning algorithm in accordance with the trained machine learning model, a second plurality of predicted activities based on the second metadata;

determine, using the machine learning algorithm in accordance with the trained machine learning model, whether the second plurality of tracked activities matches the second plurality of predicted activities within a second predefined adverse impact threshold;

in response to determining that the second plurality of tracked activities matches the second plurality of predicted activities within the second predefined adverse impact threshold, generate, using the machine learning algorithm in accordance with the trained machine learning model, a second adverse impact assessment granting preliminary access between the second user device and the one or more network resources; and create a second quantum access command for the second user device, the second quantum access command comprising one or more second keys to access the one or more network resources;

provide the second quantum access command to the second user device; and store the second plurality of predicted activities as historical data associated with the second user device.

* * * * *